United States Patent
Aetukuri et al.

(10) Patent No.: US 11,302,458 B2
(45) Date of Patent: Apr. 12, 2022

(54) COMPOSITE SOLID ELECTROLYTES FOR RECHARGEABLE ENERGY STORAGE DEVICES

(71) Applicant: International Business Machines Corporation, Armonk, NY (US)

(72) Inventors: Naga Phani Babu Aetukuri, Bangaluru (IN); Robert D. Miller, San Jose, CA (US); Young-hye Na, San Jose, CA (US); John Campbell Scott, Los Gatos, CA (US); Sogol Yahyazadeh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/658,331

(22) Filed: Oct. 21, 2019

(65) Prior Publication Data

US 2020/0051710 A1 Feb. 13, 2020

Related U.S. Application Data

(62) Division of application No. 15/594,889, filed on May 15, 2017, now Pat. No. 10,559,398.

(51) Int. Cl.
| | |
|---|---|
| *H01B 1/20* | (2006.01) |
| *B32B 27/08* | (2006.01) |
| *C08F 220/04* | (2006.01) |
| *C01B 32/158* | (2017.01) |
| *H01M 10/056* | (2010.01) |

(Continued)

(52) U.S. Cl.
CPC ............. *H01B 1/20* (2013.01); *B32B 27/08* (2013.01); *C01B 32/158* (2017.08); *C08F 220/04* (2013.01); *C08F 220/283* (2020.02); *H01M 10/056* (2013.01); *H01M 10/058* (2013.01); *H01M 10/052* (2013.01); *H01M 10/4235* (2013.01); *H01M 2300/0045* (2013.01);
(Continued)

(58) Field of Classification Search
None
See application file for complete search history.

(56) References Cited

U.S. PATENT DOCUMENTS

| | | | |
|---|---|---|---|
| 4,183,988 A | 1/1980 | Farrington et al. | |
| 4,636,314 A | 1/1987 | Beuhler et al. | |

(Continued)

FOREIGN PATENT DOCUMENTS

| | | | |
|---|---|---|---|
| CN | 1726608 A | 1/2006 | |
| CN | 1894821 A | 1/2007 | |

(Continued)

OTHER PUBLICATIONS

Capsoni et al., Recent advances in the development of Li-air batteries, Journal of Power Sources 220:253-263 (2012).

(Continued)

*Primary Examiner* — Daniel S Gatewood
(74) *Attorney, Agent, or Firm* — Karen Canaan; CanaanLaw, P.C.

(57) ABSTRACT

A device includes an ion-conducting membrane with ion-conducting ceramic particles, and an ion-conducting polymer that surrounds the ion-conducting membrane. The ion-conducting polymer includes a pressure-deformable film with a glass transition temperature lower than an operation temperature of the device.

11 Claims, 12 Drawing Sheets

(51) Int. Cl.
*H01M 10/058* (2010.01)
*C08F 220/28* (2006.01)
*H01M 10/052* (2010.01)
*H01M 10/42* (2006.01)

(52) U.S. Cl.
CPC .............. *H01M 2300/0068* (2013.01); *H01M 2300/0082* (2013.01); *H01M 2300/0094* (2013.01)

(56) References Cited

U.S. PATENT DOCUMENTS

| | | | |
|---|---|---|---|
| 4,654,104 A | | 3/1987 | McIntyre et al. |
| 4,752,370 A | | 6/1988 | McMichael et al. |
| 5,603,982 A | * | 2/1997 | Sun .................. H01M 10/0565 427/121 |
| 7,303,833 B2 | | 12/2007 | Cortright et al. |
| 7,662,517 B2 | | 2/2010 | Lee et al. |
| 7,824,806 B2 | | 11/2010 | Visco et al. |
| 7,943,269 B2 | | 5/2011 | Yates et al. |
| 8,173,325 B2 | | 5/2012 | Takagi et al. |
| 8,309,265 B2 | | 11/2012 | Miyauchi et al. |
| 9,502,729 B2 | | 11/2016 | Badding et al. |
| 2004/0191617 A1 | | 9/2004 | Visco et al. |
| 2007/0051620 A1 | | 3/2007 | Visco et al. |
| 2007/0072036 A1 | | 3/2007 | Berta et al. |
| 2008/0182157 A1 | | 7/2008 | Visco et al. |
| 2010/0068593 A1 | | 3/2010 | Reiche et al. |
| 2012/0064431 A1 | | 3/2012 | Sato et al. |
| 2012/0082919 A1 | | 4/2012 | Onuma et al. |
| 2014/0170504 A1 | | 6/2014 | Baek et al. |
| 2015/0056517 A1 | | 2/2015 | Zhou et al. |
| 2015/0072132 A1 | * | 3/2015 | Fields .................. H01B 1/128 428/220 |
| 2015/0188187 A1 | * | 7/2015 | Strand ................ H01M 10/056 429/317 |
| 2015/0255767 A1 | | 9/2015 | Aetukuri et al. |
| 2016/0204403 A1 | * | 7/2016 | Wang .................. B60L 50/64 429/156 |
| 2016/0204408 A1 | * | 7/2016 | Herle .................... H01M 4/382 429/143 |
| 2016/0254560 A1 | | 9/2016 | Aetukuri et al. |
| 2019/0109359 A1 | | 4/2019 | Aetukuri et al. |

FOREIGN PATENT DOCUMENTS

| | | |
|---|---|---|
| JP | 2003151361 A | 5/2003 |
| JP | 2008084708 A | 4/2008 |
| JP | 2013069416 A | 4/2013 |
| JP | 2017124951 A | 7/2017 |
| WO | 2017124951 A1 | 7/2017 |

OTHER PUBLICATIONS

Hammerschmidt et al., Inject Printing of Reinforcing Patterns for the Mechanical Stabilization of Fragile Polymeric Microsieves, Langmuir 28:3316-3321 (2012).

Kiesow et al., Bicontinuous Zeolite Polymer Composite Membranes Prepared via Float Casting, Journal of the American Chemical Society 135:4380-4388 (2013).

Kumar et al., Interface-mediated electrochemical effects in lithium/polymer-ceramic cells, Journal of Power Sources 195:327-334 (2010).

Liao et al., Crosslinked gel polymer electrolytes based on polyethylene glycol methacrylate and ionic liquid for lithium ion battery applications, Electrochimica Acta 87:889-894 (2013).

Magerl and Goedel, Porous Polymer Membranes via Selectively Wetted Surfaces, Langmuir 28:5622-5632 (2012).

Muhlmann et al., Preparation of Composite Membranes with Bicontinuous Structure, Langmuir 28:8197-8204 (2012).

Sun, Lithium ion conducting membranes for lithium-air batteries, Nano Energy 2:81-0816 (2013).

Yan and Goedel, Polymer Membranes with Two-Dimensionally Arranged Pores Derived from Monolayers of Silica Particles, Chemical Materials 16(9):1622-1626 (2004).

List of IBM Patents or Applications Treated as Related, filed on Oct. 21, 2019.

* cited by examiner

COMPOSITE SOLID ELECTROLYTES FOR RECHARGEABLE ENERGY STORAGE DEVICES

BACKGROUND

Energy storage devices such as lithium ion batteries have high energy density, and provide a compact, rechargeable energy source suitable for use in portable electronics, electric transportation, and renewable energy storage.

Liquid electrolytes used in Li-ion batteries can reduce battery cycling life, and solid electrolytes can be used to provide safer and longer lasting batteries. Suitable solid electrolyte materials should have a unique combination of characteristics such as, for example, high Li-ion conductivity, high elastic modulus, electrochemical stability, and good interfacial contact with battery electrodes.

SUMMARY

In various embodiments, the present disclosure is directed to a solid-state electrolyte for an energy storage device that includes high ion conductance, can be made thin and flexible, and can suppress dendrite growth and penetration into the electrolyte at the surface of a metallic electrode.

In one aspect, the present disclosure is directed to a device including an ion-conducting membrane and an ion-conducting polymer that surrounds the ion-conducting membrane.

In another aspect, the present disclosure is directed to a device including an ion-conducting membrane including ceramic particles, and a film surrounding the ion-conducting membrane including an ion-conducting polymer, wherein the ion-conducting polymer is pressure-deformable and has a glass transition temperature lower than the device operation temperature.

In yet another aspect, the present disclosure is directed to a method for making an energy storage device including dipping an ion-conducting membrane into a pre-polymer mixture of an ion-conducting polymer, wherein the pre-polymer mixture includes polymerizable compounds, an Li-ion salt, a polymerization initiator, and an optional ionic liquid. The method further comprises polymerizing the pre-polymer mixture under curing conditions (for example, UV or visible light, heat, microwaves, and combinations thereof) when it is on the ion-conducting membrane. The method may further include assembling the resulting free-standing solid electrolyte with electrodes.

In yet another aspect, the present disclosure is directed to a method for making an energy storage device including dipping an ion-conducting membrane into a pre-polymer mixture of an ion-conducting polymer, wherein the pre-polymer mixture includes polymerizable compounds, an Li-ion salt, a polymerization initiator, and an optional ionic liquid. The method also includes assembling the ion-conducting membrane, while it is still wet from the pre-polymer mixture, with electrodes to form a storage device. The method further includes polymerizing, in-situ, the pre-polymer mixture inside the storage device by applying stimuli (for example, heat).

The solid-state electrolyte of the present disclosure may provide benefits in a rechargeable lithium battery including, but not limited to: (1) improved interfacial contact with solid electrodes which can result in low area specific resistance (ASR) toward Li-ion transport across an Li-conducting membrane (surface planarization effect); (2) improved accommodation of electrode volume changes (cushion effect); and (3) improved interfacial stability toward Li-electrodes (protection effect). The all solid-state Li-battery electrolyte provides both the improved performance of a solid electrolyte along with the increased energy density provided by use of a metallic Li-anode, without compromising safety or compactness.

The details of one or more embodiments of the present disclosure are set forth in the accompanying drawings and the description below. Other features, objects, and advantages of the present disclosure will be apparent from the description and drawings, and from the claims.

BRIEF DESCRIPTION OF DRAWINGS

Like symbols in the figures indicate like elements.

DETAILED DESCRIPTION

Figure 1:
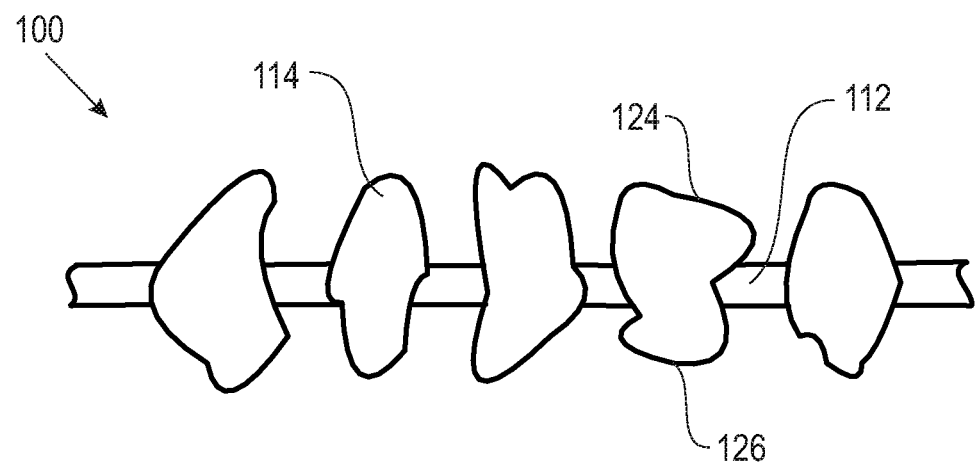
FIG. 1 is a schematic, cross-sectional view of an ion-conducting membrane that may be incorporated into a solid electrolyte.

FIG. 1 is a schematic illustration of an ion-conducting membrane 100 including ion-conducting ceramic particles 114 and an insulating polymeric binder 112. The ion-conducting membrane 100 includes a first major surface 124 and an opposing, second major surface 126. In some embodiments, the ion conducting membrane 100 includes a contiguous solid structure of fused or sintered ion-conducting ceramic particles 114. In other embodiments, the ion-conducting ceramic particles 114 may be linked by an optional insulating polymeric binder 112, wherein at least a portion of the ion-conducting ceramic particles 114 extend from the first surface 124 to the second surface 126. In some embodiments, the ion-conducting ceramic particles 114 in the ion conducting membrane 100 form a single layer. In various embodiments, which are not intended to be limiting, the thickness of the ion-conducting membrane 100 is about 0.1 microns to about 100 microns.

The insulating polymeric binder 112 may be chosen from, for example, cyclo-olefin polymers, poly-para-xylylenes, benzocyclobutenes, olefin addition polymers, olefin addition copolymers, ring opening metathesis polymers and reduced forms thereof, fluorocarbon addition polymers, fluoroether polymers, cyclobutyl fluoroethers, polyarylenes, polyarylene ethers, polybenzoazoles, polysiloxanes, silsequioxanes, polycarvosilanes, and combinations thereof. In some embodiments, the polymeric binder is selected such that the ion-conducting membrane 100 is flexible.

In various embodiments, the ion-conducting ceramic particles 114 have an elastic modulus of greater than about 6 GPa. In some embodiments, a shear modulus greater than 6 GPa may suppress dendrite formation on the surface of a metallic electrode and prevent dendrite penetration into the ion-conducting membrane 100. More specifically, a shear modulus greater than double the shear modulus of Li, wherein the shear modulus of Li is 3.4 GPa, may efficiently suppress dendrite growth. The ion-conducting ceramic particles 114 may be chosen from, for example, LiPON, LISICON ($Li_{14}Zn(GeO_4)_4$), LAGP ($Li_{1.5}Al_{0.5}Ge_{1.5}(PO_4)_3$), LATP ($Li_{1.3}Al_{0.3}Ti_{1.7}(PO_4)_3$), LATTP ($Li_{1.6}Al_{0.5}Ti_{0.95}Ta_{0.5}(PO_4)_3$), LLZO ($Li_7La_3Zr_2O_{12}$), Li-β-alumina, doped $Li_3N$, $Li_2S$—$SiS_2$—$Li_3PO_4$, $Li_7P_3S_{11}$, $Li_{10}GeP_2S_{12}$ and mixtures and combinations thereof.

Figure 2:
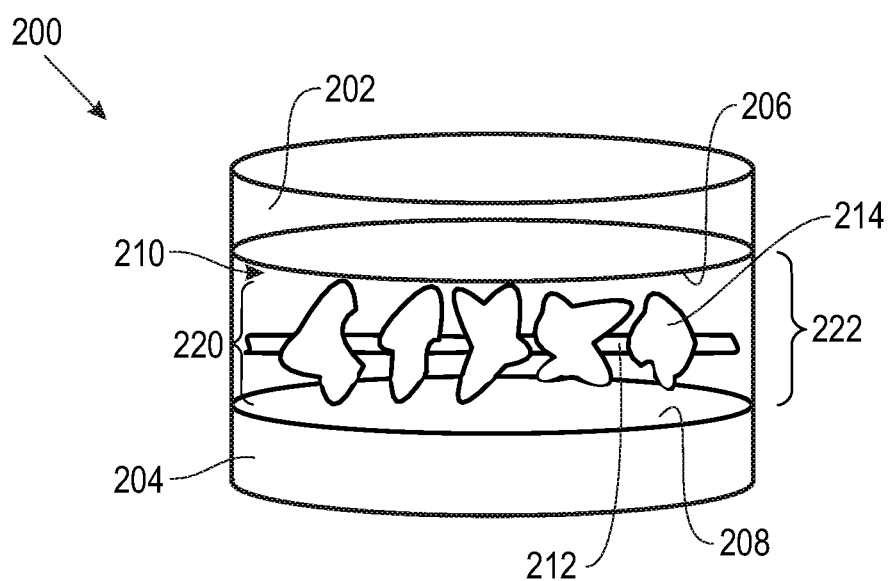
FIG. 2 is a schematic, cross-sectional view of an energy storage device including the ion-conducting membrane of FIG. 1.

FIG. 2 illustrates an energy storage article 200 including a solid-state electrolyte 222. The solid-state electrolyte 222 includes an ion-conducting membrane 220 (as shown in FIG. 1) surrounded by an ion-conducting polymer 210. The solid-state electrolyte 222 has a first surface 206 and a second surface 208, and in some embodiments, the first surface 206 and the second surface 208 are substantially planar. The energy storage article 200 further includes a first solid electrode 202 and a second solid electrode 204. In the embodiment shown in FIG. 2, the first solid electrode 202 directly contacts the first surface 206 of the solid-state electrolyte 222, and the second solid electrode 204 directly contacts the second surface 208 of the solid-state electrolyte 222, but direct interfacial contact is not required. In some embodiments, which are not intended to be limiting, the first solid electrode 202 is an anode, and the second solid electrode 204 is a cathode.

Suitable first solid electrodes 202 may be chosen from Li-intercalating graphitic anodes, lithium titanate (LTO), silicon, metallic Li-anodes, and the like. In some embodiments, metallic Li-anodes may provide a specific anode capacity almost 10 times larger than that of an Li-intercalating graphitic anode, and metallic Li-anodes may further maximize the overall energy density of the energy storage device 200.

In various embodiments, the average distance between the first solid electrode 202 and the ion-conducting membrane 220 may be less than about 10 microns, or less than about 5 microns, or less than about 1 micron, or less than about 0.2 micron. In some embodiments, the average distance between the second solid electrode 204 and the ion-conducting membrane 220 may also be less than about 10 microns, or less than about 5 microns, or less than about 1 micron, or less than about 0.2 micron.

In some embodiments, the ion-conducting polymer 210 may improve the interfacial contact with one or both of the solid electrodes 202, 204. If the solid-state electrolyte 222 formed by surrounding the ion-conducting membrane 220 with the ion-conducting polymer 210 includes a substantially planar first surface 206 or a planar second surface 208, surface planarization effects can improve interfacial contact with the solid electrodes 202, 204. Surface planarization effects may also result in low area specific resistance toward Li-ion transport across a Li-conducting membrane.

Because the ion-conducting polymer 210 is thin, even if the ion-conducting polymer has lower conductance than the ion-conducting membrane 220, there can still be good ion conductance across solid-state electrolyte 222.

In some embodiments, the ion-conducting polymer 210 may be selected from pressure deformable materials, which may accommodate volume changes that may occur in the energy storage device 200. For example, volume changes may occur during charge or discharge cycles in either or both electrodes, or may occur during various applications of the energy storage device 200. For example, a Li-ion battery including a solid-state electrolyte of the present disclosure may be used as a rechargeable battery for a cell phone. If a user of the cell phone were to sit down with the cell phone in his or her pants pocket, the volume of the Li-ion battery could change upon the increase in pressure on the cell phone. A pressure deformable ion-conducting polymer 210 may allow for volume changes to the solid-state electrolyte 222 without causing damage to the storage device or the ion-conducting membrane 220, which is referred to herein as a cushioning effect.

The ion-conducting polymer 210 in a solid-state electrolyte 222 may also allow metallic Li-electrodes or the like to be used in an energy storage device in place of Li-intercalating graphitic electrodes. In some embodiments, the ion-conducting polymer 210 may be selected from materials that are electrochemically stable when in contact with a metallic electrode, whereas the ion-conducting membrane 220 (more specifically ion-conducting ceramic particles in the ion-conducting membrane 220) may be selected from materials that are not electrochemically stable with metallic electrodes. As used herein, electrochemically stable refers to a material that will not substantially react when placed in contact with a metallic electrode material.

Materials that are electrochemically unstable with metallic electrodes may have a higher conductance than those that are stable with metallic electrodes. Therefore, an electrochemically unstable material for the ion-conducting membrane 220 may provide the solid-state electrolyte 222 with a desired conductance, while an electrochemically stable ion-conducting polymer 210 surrounding the ion-conducting membrane 220 can make possible the use of metallic electrodes in contact with the solid-state electrolyte 222.

Figure 3:
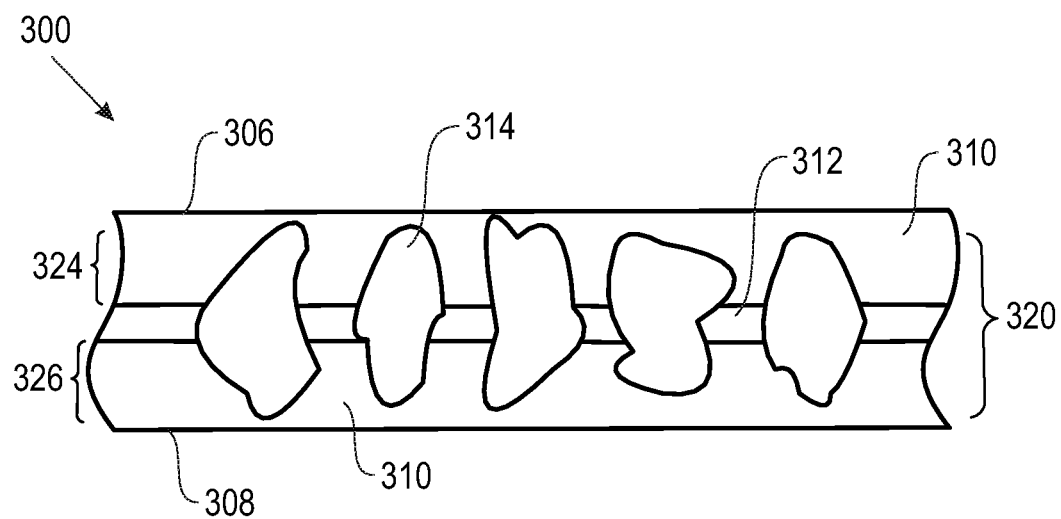
FIG. 3 is a schematic, cross-sectional view of a solid electrolyte that may be incorporated into an energy storage device such as a Li-ion battery.

FIG. 3 illustrates an example of a solid-state electrolyte 300 including an ion-conducting membrane 320 (as shown in FIG. 1) surrounded by an ion-conducting polymer 310. In various embodiments, the ion-conducting polymer 310 may be chosen from linear polymers, crosslinked polymers, star polymers, and block copolymers. In some embodiments, which are not intended to be limiting, the ion-conducting polymer 310 may have a glass transition temperature ($T_g$) lower than the device operation temperature.

In some embodiments, the ion-conducting polymer 310 may include a compound that releases Li-ions, such as a Li-salt. Suitable Li-salts include, but are not limited to, lithium hexafluoroarsenate ($LiAsF_6$), lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$), lithium nitrate and lithium bis(trifluoromethanesulfonyl)imide (LiTFSI).

In some embodiments, the ion-conducting polymer 310 may include an ionic liquid, which as used in this application refers to an ionic, salt-like material that is liquid below a temperature of about 100° C. and has a melting point below room temperature, or below about 20° C., or below about 0° C. Suitable ionic liquids include, but are not limited to, 1-methyl-1-propyl piperidinium bis(trifluoromethylsulfonyl)imide, 1-butyl-1-methyl piperidinium bis(trifluoromethylsulfonyl)imide, 1-ethyl-1-methylpyrrolidinium tetrafluoroborate, 1-methyl-1-propylpyrrolidinium tetrafluoroborate, 1-butyl-1-methylpyrrolidinium tetrafluoroborate, 1-ethyl-1-methylpyrrolidinium bis(trifluoromethylsulfonyl)imide, 1-methyl-1-propylpyrrolidinium bis(trifluoromethyl sulfonyl)imide, 1-butyl-1-methylpropylpyrrolidinium bis(trifluoromethylsulfonyl)imide, 1-ethyl-3-methylimidazolium-bis(trifluoromethylsulfonyl)imide, 1-methyl-3-propylimidazolium-bis(trifluoromethylsulfonyl)imide, 1-butyl-3-methylimidazolium-bis(trifluoromethylsulfonyl) imide, 1-ethyl-3-methylimidazolium-tetrafluoroborate, 1-methyl-3-propyllimidazolium-tetrafluoroborate, 1-butyl-3-methylimidazolium-tetrafluoroborate, and 1-propyl-3-methylpyridinium-bis(trifluoromethylsulfonyl)imide.

In some embodiments, the ion-conducting polymer 310 may include an optional inorganic filler. In some embodiments, the inorganic filler may help reinforce the ion-conducting polymer 310, which may be soft. In some embodiments, the inorganic filler may also enhance the shear modulus of the ion-conducting polymer 310. In some embodiments, the inorganic filler acts as a reinforcing filler and has multiple sites available for crosslinking. Suitable inorganic fillers may be chosen from, but are not limited to, carbon nanotubes, silica nanoparticles, POSS compounds, metal oxides, and combinations thereof.

POSS compounds of the present disclosure are molecular-sized nanoparticles having an arrangement of atoms or molecules bonded to create a fully or a substantially bounded space. In some embodiments, which are not intended to be limiting, the term POSS compound refers to resins having the structures (I), (II), or (III) below, where:

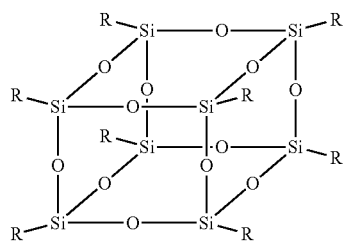

is denoted by the formula $T_8^R$, where T represents $RSiO_{3/2}$;

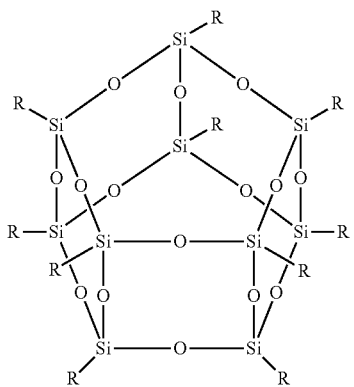

is denoted by the formula $T_{10}^R$, where T represents $RSiO_{3/2}$; or

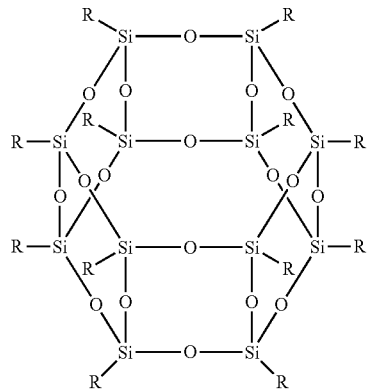

is denoted by the formula $T_{12}^R$, where T represents $RSiO_{3/2}$.

In each of the structures (I)-(III) above, R is independently selected from polymerizable groups or non-polymerizable groups. R is preferably independently selected from $(L)_n$-OH, $(L)_n$-NH$_2$, or $(L)_n$-O—CO—C$_2$H$_3$, wherein L is a linking group such as alkylene, arylene, siloxy, an ether linkage, or combination of thereof, and n is an integer from 0 to 10, or 0 to 6.

The functionalized POSS compounds in structures (I)-(III) above may be denoted by the general formulas $T_m^R$ where m is equal to 8, 10 or 12. When m=8, a common name of the compound is octakis(N) silsesquioxane, where N is the name of the R group.

In some embodiments, the formulations used to make the inorganic filler of the ion-conducting polymer 310 may include mixtures of $T_8^R$ POSS compounds with different R groups, mixtures of $T_{10}^R$ POSS compounds with different R groups, and/or mixtures of $T_{12}^R$ POSS compounds with different R groups. In some embodiments, the compositions of the present disclosure may include mixtures of $T_8^R$, $T_{10}^R$ and $T_{12}^R$ POSS compounds.

In some embodiments, suitable POSS compounds include the compounds of structural formula (III) above, with functional groups including at least more than one polymerizable moiety. Suitable examples include functional groups that are polymerizable moieties such as, for example, methacrylate, acrylate, vinyl, and epoxy. Suitable polymerizable POSS compounds are available from Hybrid Plastics Co., Hattiesburg, Miss.

In some embodiments, the ion-conducting polymer 310 is a thin film surrounding the ion-conducting membrane 320. In some embodiments, the ion-conducting polymer 310 has a lower conductivity than the ion-conducting membrane 320, but if the ion-conducting polymer 310 is sufficiently thin, the high conductance of the ion-conducting membrane 320 is not significantly impacted by the lower conductance of the ion-conducting polymer 310. Further, a thinner ion-conducting polymer 310 reduces inter-particle interfacial resistance between the ion-conducting ceramic particles 314 and an electrode. In one embodiment, the ion-conducting polymer 310 includes two planar surfaces 306, 308, which can provide good interfacial contact with an electrode, if in direct contact with the electrode.

In various embodiments, the solid-state electrolyte 300 may have a conductivity of at least $10^{-7}$ S/cm measured at room temperature, or at least $10^{-4}$ S/cm measured at room temperature.

Figure 4:
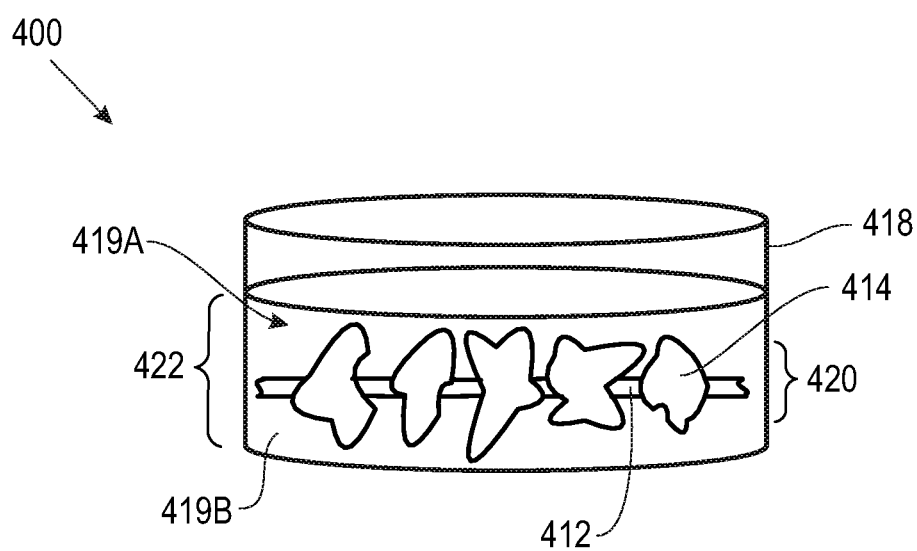
FIG. 4 is a schematic, cross-sectional view of an apparatus suitable for forming a solid electrolyte.

FIG. 4 is a schematic illustration of an apparatus 400 that may be used to make a solid-state electrolyte 422 suitable for use in, for example, an energy storage device such as a Li-ion battery. The apparatus 400 includes a mold 418 to shape the solid-state electrolyte 422. The mold 418 retains a pre-polymer mixture 419A, which may be polymerized to form an ion-conducting polymer 419B.

In some embodiments, the pre-polymer mixture 419A includes polymerizable compounds, an Li-salt, a polymerization initiator, and an optional ionic liquid. The polymerizable compounds of the pre-polymer mixture 419A may be chosen from monomers, oligomers or mixtures and combinations thereof, any of which can form linear polymers, branched polymers, crosslinked polymers, star polymers, block copolymers, and mixtures and combinations thereof.

The polymerization of the compounds in the pre-polymer mixture 419A may be performed under curing conditions when the pre-polymer mixture 419A contacts the ion-conducting membrane 420. The curing conditions may include one or more of ultraviolet (UV) or visible light, heat, microwaves, ultrasound, or the like. In some embodiments, the polymerization could instead be performed, in-situ, with the pre-polymer mixture 419A inside the article 400 by applying a stimulus, wherein the stimulus may include one or more of ultraviolet (UV) or visible light, heat, microwaves, ultrasound, or the like.

The polymerization results in a thin, pressure-deformable ion-conducting polymer 419B surrounding the ion-conducting polymer 420, which includes ion-conducting ceramic particles 414 retained by an insulating polymeric binder 412. The resulting construction forms a solid-state electrolyte 422 with a desired shape for a particular application.

Figure 5:
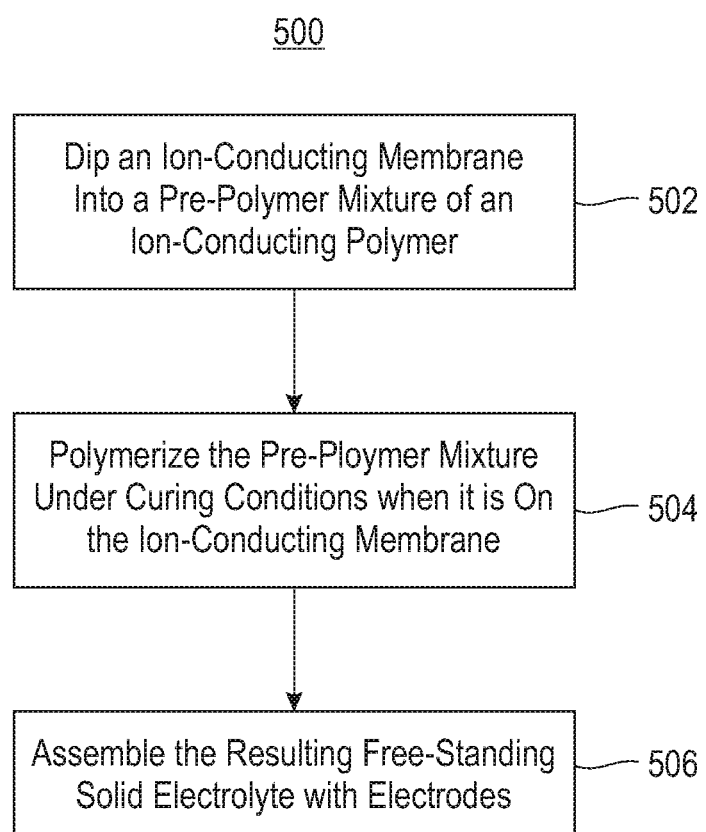
FIG. 5 is a flow diagram illustrating an example technique for forming an example Li-ion battery.

FIG. 5 is a flow diagram illustrating an example technique 500 that may be used to make an energy storage device. Referring also to FIG. 4, the technique 500 includes a step 502 in which an ion-conducting membrane 420 is dipped into a pre-polymer mixture 419A including polymerizable compounds such as monomers, oligomers and mixtures and combinations thereof, a Li-salt, a polymerization initiator, and an optional ionic liquid.

In step 504, the pre-polymer mixture 419A is then at least partially polymerized when it is on the ion-conducting membrane 420 by exposing the pre-polymer mixture 419A to one or more of ultraviolet (UV) or visible light, heat, microwaves, ultrasound, or the like. In some embodiments, the technique may include the use of a mold, as such, for example, the apparatus 400 of FIG. 4, although a mold is not required. For example, the ion-conducting membrane 420 that has been wet by the pre-polymer mixture 419A may be polymerized free-standing, or may be sandwiched between glass plates to ensure that the resulting solid-state electrolyte construction 422 is sufficiently thin for use in a desired application.

In some embodiments, the technique 500 of FIG. 5 further includes a step 506 of assembling the resulting free standing solid-electrolyte 422 with solid electrodes to form an energy storage device as shown in FIG. 2. In some embodiments, the solid electrodes may include an anode and a cathode that are of different materials. For example, the anode may be a lithium-intercalating graphitic, a lithium titanate (LTO), silicon, or a metallic lithium electrode, while the cathode may be $LiCoO_2$, $LiNi_{0.8}Co_{0.15}Al_{0.05}O_2$ (NCA), $LiMn_2O_4$, lithium nickel manganese cobalt oxide, or $LiFePO_4$. In other embodiments, the solid electrolyte 422 may be used for applications other than Li-ion batteries, such as, for example, metal-air batteries or metal sulfur batteries.

Figure 6:
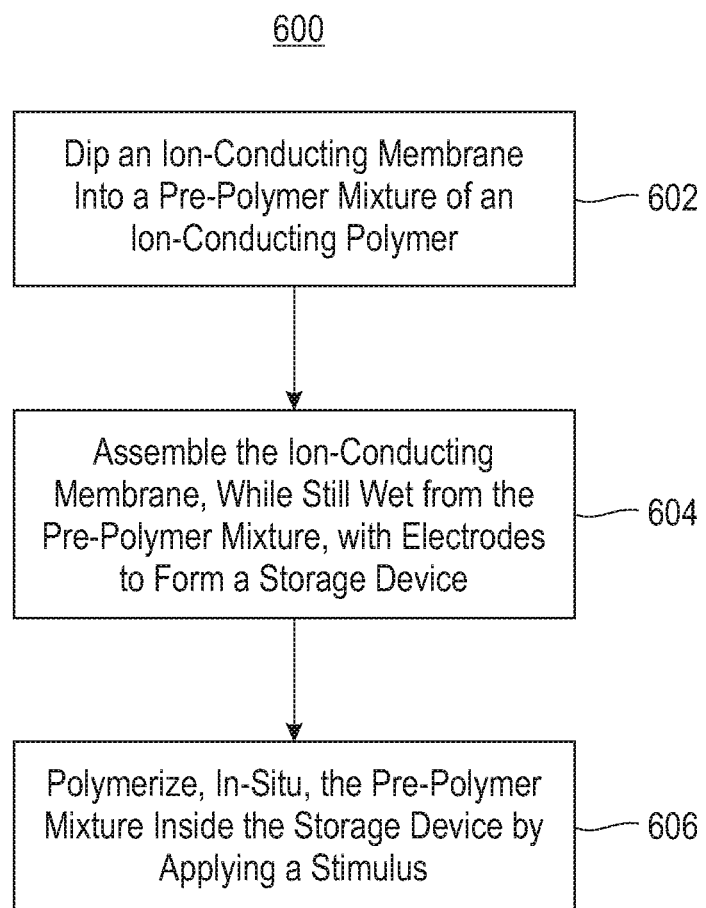
FIG. 6 is a flow diagram illustrating an example technique for forming an example Li-ion battery.

FIG. 6 is a flow diagram illustrating another example technique 600 that may be used to make an energy storage device. Referring also to FIG. 4, the technique 600 includes a step 602 in which an ion-conducting membrane 420 is dipped into a pre-polymer mixture 419A, wherein the pre-polymer mixture 419A includes polymerizable compounds (monomers and/or oligomers), a Li-salt, a polymerization initiator, and an optional ionic liquid. In step 604, the ion-conducting membrane 420, which is wet with the pre-polymer mixture 419A, is then placed in between two solid electrodes (cathode and anode) and polymerized in-situ in step 606 by applying one or more of ultraviolet (UV) or visible light, heat, microwaves, ultrasound, or the like to form an ion-conducting polymer 419B. The ion-conducting membrane 420, in combination with the ion-conducting polymer 419B, provides a solid-state electrolyte 422. In some embodiments, the solid electrodes may include an anode and a cathode that are of different materials. For example, the anode may be a lithium-intercalating graphitic, a lithium titanate (LTO), a silicon, or a metallic lithium electrode, while the cathode may be $LiCoO_2$, $LiNi_{0.8}Co_{0.15}Al_{0.05}O_2$ (NCA), $LiMn_2O_4$, or $LiFePO_4$. In other embodiments, the solid electrolyte 422 may be used for applications other than Li-ion batteries, such as, for example, metal-air batteries or metal sulfur batteries.

Embodiments of the present disclosure will now be described with reference to the following non-limiting examples.

EXAMPLES

Example 1: Fabrication of Ion-Conducting Membrane

Ion-conducting membranes were fabricated using the process described in U.S. Patent Application Publication No. 2015/0255767, which is incorporated herein by reference in its entirety. An ethanol soluble adhesive tape, with adhesive side facing up, was attached to a silicon wafer and used as a substrate. The substrate was annealed at 75° C. for 5 minutes to ensure the surface was flat and free of wrinkles. Li-ion conducting glass ceramic particles ($Li_{1.6}Al_{0.5}Ti_{0.95}Ta_{0.5}(PO_4)_3$) were used as the ion-conducting ceramic particles (from Ohara Corp., Rancho Santa Margarita, Calif.). The Li-ion conducting glass ceramic particles have a Li-conductivity of $7 \times 10^{-4}$ S/cm at room temperature and $1.1 \times 10^{-2}$ S/cm at 100° C. The Li-ion conducting glass ceramic particles within the size range of 45 μm to 63 μm were scattered on the adhesive tape. The substrate was then shaken to distribute the unattached ion-conducting ceramic particles to form a single layer, ion-conducting ceramic particle film with a high packing density. A 10 wt % solution of cyclo-olefin polymer (available under the trade designation Zeonor 1430 from Zeon Corp., Japan) in decalin was coated on the ion-conducting ceramic particles using a draw down coating application with a 20 μm gate opening.

To form a continuous polymer matrix around the particles, the solvent was largely removed by heating the coated ion-conducting ceramic particles on the substrate at 70° C. for 3 hours. Then, the adhesive tape was removed by submerging the substrate into ethanol at 70° C. overnight, which resulted in the bottom part of the ion-conducting membrane being exposed. The excess polymer on the top surfaces of the ion-conducting ceramic particles was removed by etching in a dry reactive oxygen plasma (MARCH).

Figure 7A:
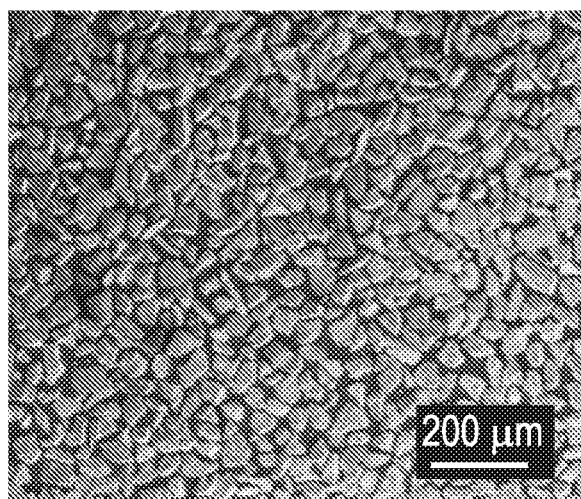
FIGS. 7A-7B are overhead plan views and cross-sectional SEM images of the ion-conducting membrane of Example 1.
Figure 7B:
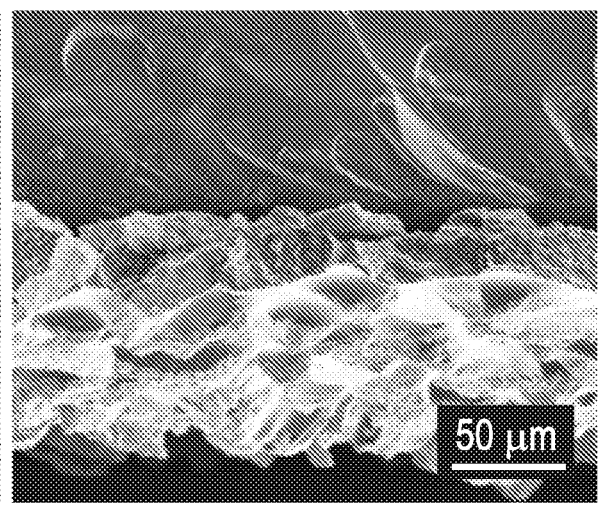

FIGS. 7A-7B show top-down and cross-sectional SEM images of the resulting ion-conducting membrane. Under those conditions after etching, the insulating polymeric binder only filled in between the ion-conducting ceramic particles, and both top and bottom parts of the ion-conducting ceramic particles were not covered by the insulating polymeric binder.

Example 2: Preparation of Ion-Conducting Polymer Pre-Polymer Mixture Including Crosslinked PEG System A pre-polymer mixture to form a crosslinked PEG ion-conducting polymer was prepared by mixing a 4 to 1 molar ratio of poly(ethylene glycol) methyl ether acrylate (PEGMA, molecular weight=480) to polyethylene (glycol) diacrylate (PEGDA, molecular weight=700). Then, LiTFSI, as the Li-salt, was added with the molar ratio of EO/Li=20, wherein EO is a repeating number of ethylene oxide units in the PEGMA and PEGDA. A 60 wt % of ionic liquid (1-butyl-1 methylpyrrolidinium bis (triflouromthylsulfonyl) imide) was added to the total mass of PEDMA and PEGDA as a plasticizer. Finally, 1 wt % to the total mass of PEDMA and PEGDA of initiator (Darocur 1173 for UV curing and ARM for thermal curing) was added to the system. The pre-polymer mixture preparation was performed inside a glove box at room temperature. The pre-polymer mixture was stirred until a homogenous solution was obtained, generally for 7 to 8 hours.

Example 3: Characterization of Intrinsic Ionic Conductivity of Crosslinked PEG Ion-Conducting Polymer 150 μL of the pre-polymer mixture prepared by the method shown in EXAMPLE 2 was sandwiched between two Teflon-coated quartz plates, separated by a spacer. The pre-polymer mixture was then polymerized by being exposed to 365-nm UV light for 90 s at 9 mW/cm$^2$.

The ion-conducting polymer obtained by this process showed a glass transition temperature of −55° C. (by DSC), a thermal stability up to 300° C. (by TGA), a storage modulus of 0.04 MPa at 25° C. (by DMA), and an ionic conductivity of ~5×10$^{-5}$ S/cm at room temperature and 7.6×10$^{-4}$ S/cm at 70° C. (by impedance analyzer).

Example 4: Integration of Crosslinked PEG Ion-Conducting Polymer with Ion-Conducting Membrane A composite solid-state electrolyte comprised of a crosslinked PEG ion-conducting polymer and an ion-conducting membrane was prepared by wetting the ion-conducting membrane of EXAMPLE 1 with the PEG pre-polymer mixture of EXAMPLE 2. Then, the ion-conducting membrane wet with the pre-polymer mixture was polymerized by radiation with 365 um UV-light for 90 sec to obtain the ion-conducting polymer.

Figure 8:
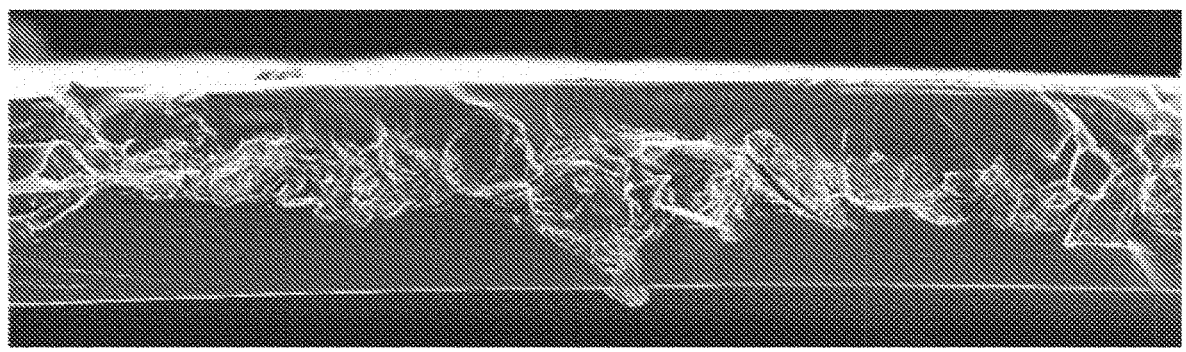
FIG. 8 is a cross-sectional SEM image of the solid-state electrolyte of Example 4.

FIG. 8 shows the cross-sectional SEM image of the resulting solid-state electrolyte with total thickness of about 90 μm. To minimize the thickness of PEG ion-conducting polymer layer, two quartz plates were used to sandwich the ion-conducting membrane wet by the pre-polymer mixture before UV polymerization.

Example 5: Preparation of Li—Li Symmetric Cell with PEG Ion-Conducting Polymer Coated on Ion-Conducting Membrane To ensure good interfacial contact between the solid-state electrolyte and Li-electrodes, in-situ PEG polymerization was performed after coin-cell assembly with Li-electrodes. An ion-conducting membrane of EXAMPLE 1 was immersed into the PEG pre-polymer mixture of EXAMPLE 2 in the presence of an AIBN initator. The ion-conducting membrane, wet with the pre-polymer mixture, was then placed in between two Li-foils to assemble a Li—Li symmetric coin cell energy storage device. The coin cell was then heated at 70° C. for 24 hours in a vacuum oven to induce thermal crosslinking of the PEG pre-polymer mixture within the cell to form the ion-conducting polymer surrounding the ion-conducting membrane.

Example 6: Cycling Behavior of Li—Li Symmetric Cell with PEG Ion-Conducting Polymer Coated on Ion-Conducting Membrane To demonstrate the electrochemical performance of the solid-state electrolyte comprised of the PEG ion-conducting polymer and ion-conducting membrane, the Li—Li symmetric coin cell prepared using the method of EXAMPLE 5 was cycled using a VMP3 BioLogic multi-channel potentiostat. The cell was discharged and charged sequentially for 6 hours each cycle at a current density of 0.2 mA/cm$^2$.

Figure 9:
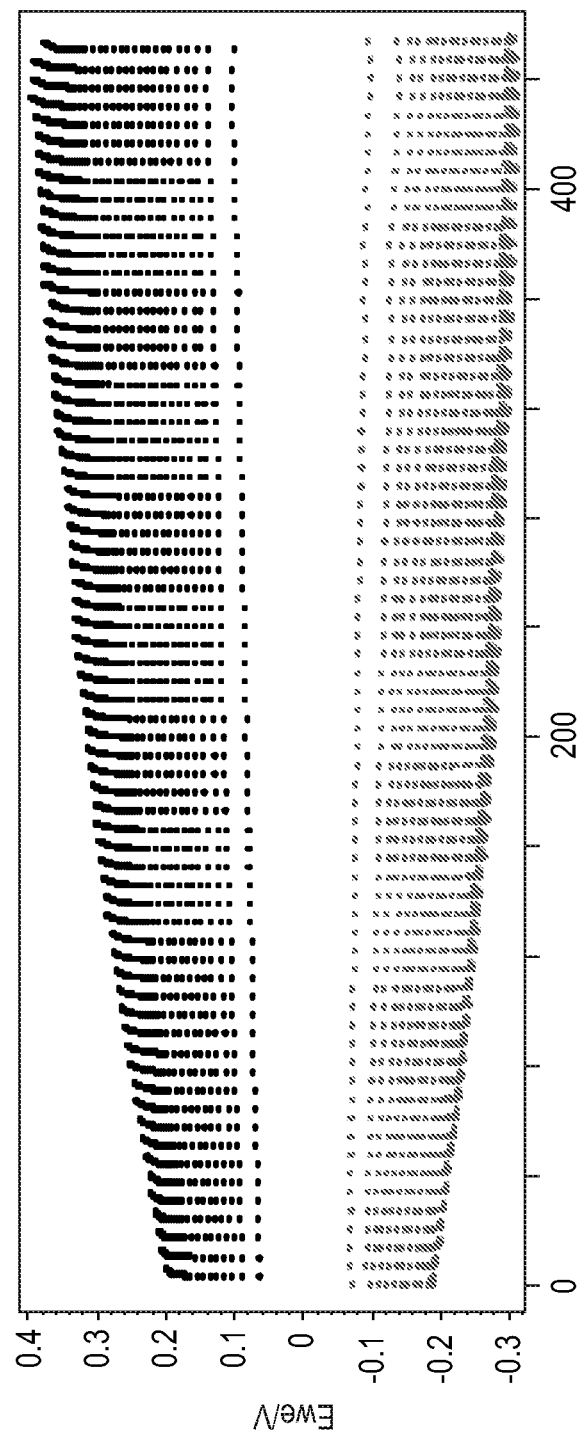
FIG. 9 is a plot of the plating and striping profile of the cell of Example 6.

Referring to FIG. 9, the cell demonstrated a good plating and striping profile for more than 400 hours, which was more than 70 cycles.

Example 7: Preparation of Ion-Conducting Polymer Pre-Polymer Mixture Including Crosslinked POSS-PEG System A pre-polymer mixture to form a crosslinked POSS-PEG ion-conducting polymer was prepared by mixing a 10 to 1 mass ratio of poly(ethylene glycol) methyl ether acrylate (PEGMA, molecular weight=480) with cage compounds including methacryl polyhedral oligomeric silsesquioxane (POSS). This was followed by adding LiTFSi with the ratio of EO/Li=20 and 1 wt % of initiator (Darocur 1173) to the total mass of PEGMA and POSS. The pre-polymer mixture preparation was done inside a glove box at room temperature. The pre-polymer mixture was stirred until a homogenous solution was obtained, generally for 7 to 8 hours.

Example 8: Characterization of Intrinsic Ionic Conductivity of Crosslinked POSS-PEG Ion-Conducting Polymer 150 μL of the pre-polymer mixture prepared by the method shown in EXAMPLE 7 was sandwiched between two Teflon-coated quartz plates separated by a spacer. The pre-polymer mixture was then polymerized by exposure to a 365-nm UV light for 90 s at 9 mW/cm$^2$ to obtain the ion-conducting polymer. The ion-conducting polymer obtained by this process showed a glass transition temperature of −52° C. (by DSC), a thermal stability up to 300° C. (by TGA), a storage modulus of 1.1 MPa at 25° C. (by DMA), and an ionic conductivity of about 4×10$^{-5}$ S/cm at room temperature (by impedance analyzer).

Example 9: Cycling Behavior of Li—Li Symmetric Cell with POSS-PEG Ion-Conducting Polymer Coated on Ion-Conducting Membrane To demonstrate the electrochemical performance of the solid-state electrolyte, a symmetric Li/Li cell was assembled with the solid-state electrolyte by following the process described in EXAMPLE 5, except using the POSS-PEG pre-polymer mixture of EXAMPLE 7 instead of the PEG pre-polymer mixture of EXAMPLE 2 for the ion-conducting polymer. The cell was discharged and charged sequentially for 6 hours each cycle at a current density of 0.2 mA/cm$^2$.

Figure 10:
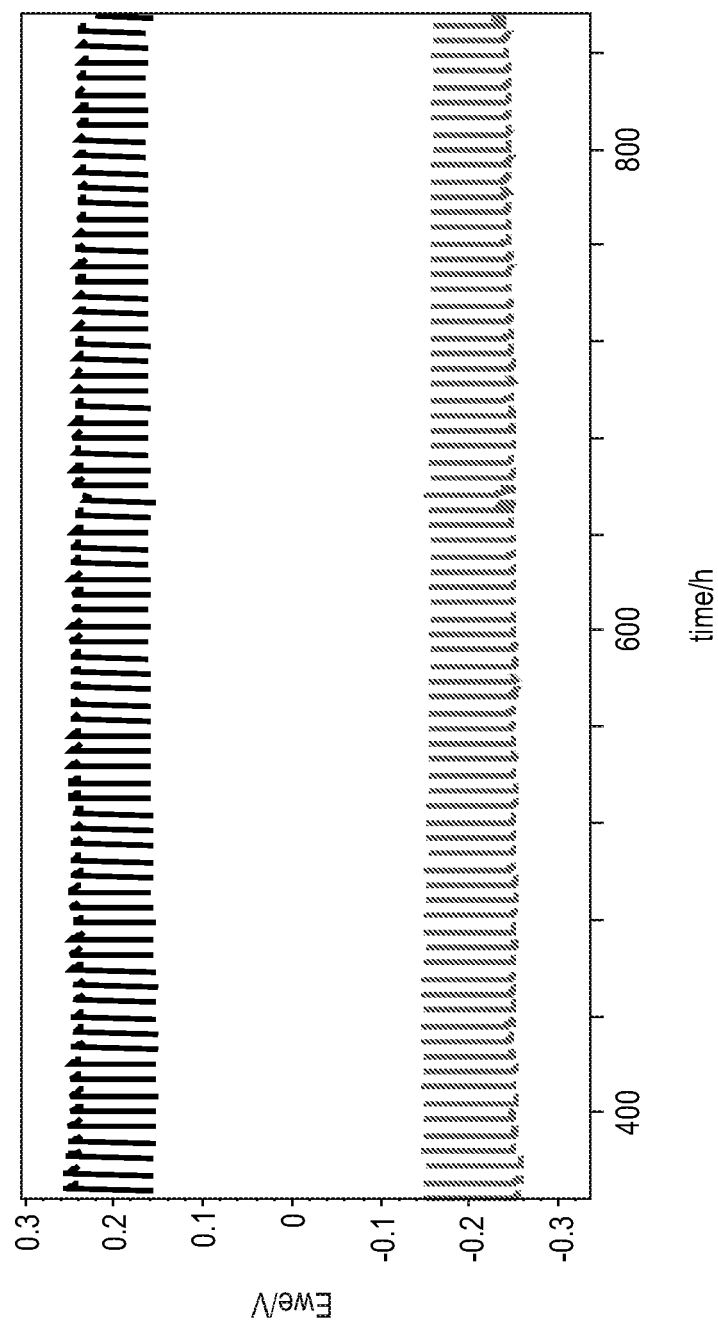
FIG. 10 is a plot of the charge-discharge (plating and stripping) profile of the cell of Example 9.

As seen in FIG. 10, the cell demonstrated very stable charge-discharge profiles without significant increase in the potential for more than 800 hours, which was more than 130 cycles under the current density of 200 µA/cm$^2$ at room temperature.

Comparative Example 1: Electrochemical Behavior of Li—Li Symmetric Cell Prepared with Crosslinked PEG Ion-Conducting Polymer without Ion-Conducting Membrane For comparison, a crosslinked PEG ion-conducting polymer without an integrated ion-conducting membrane was used as a solid-state electrolyte. A Li/Li symmetric cell was assembled by drop-casting one Li-electrode with a PEG pre-polymer mixture prepared with the method described in EXAMPLE 2. Then, it was polymerized by exposure to a 365-nm UV light for 90 seconds. The crosslinked PEG-coated Li-electrode was then covered with another Li-electrode.

Figure 11:
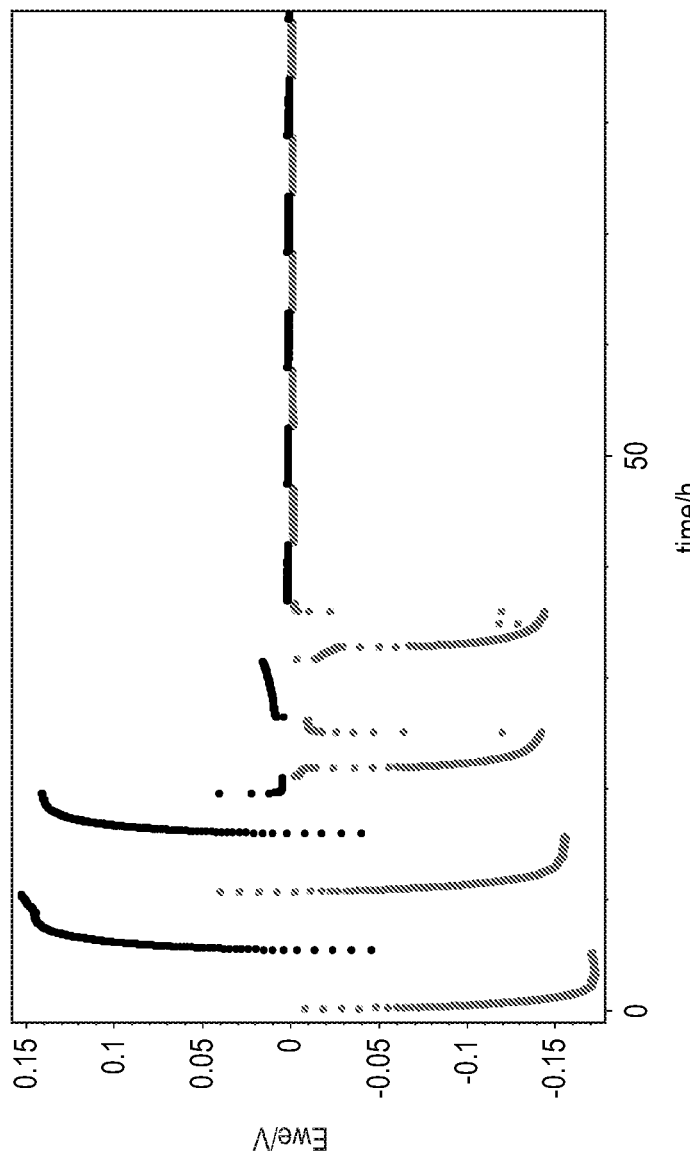
FIG. 11 is a plot of the galvanostatic cycling behavior of a Li/Li symmetric cell assembled with the crosslinked PEG ion-conducting polymer electrolyte as described in Comparative Example 1.

FIG. 11 shows the galvanostatic cycling behavior of the Li/Li symmetric cell assembled with the crosslinked PEG ion-conducting polymer electrolyte. The cell was charged and discharged sequentially for a period of 10 hours at various current densities. As seen in FIG. 11, the cell had a short-circuit after a few cycles under a very low current density of about 25 µA/cm$^2$.

Comparative Example 2: Electrochemical Behavior of Li—Li Symmetric Cell Prepared with Crosslinked POSS-PEG Ion-Conducting Polymer without Ion-Conducting Membrane For comparison, a crosslinked POSS-PEG ion-conducting polymer without an integrated ion-conducting membrane was used as a solid-state electrolyte. A Li/Li symmetric cell was assembled by drop-casting one Li-electrode with a POSS-PEG pre-polymer mixture prepared with the method described in EXAMPLE 7. Then, it was polymerized by exposure to a 365-nm UV light for 90 s. The crosslinked POSS-PEG-coated Li-electrode was then covered with another Li-electrode.

Figure 12:
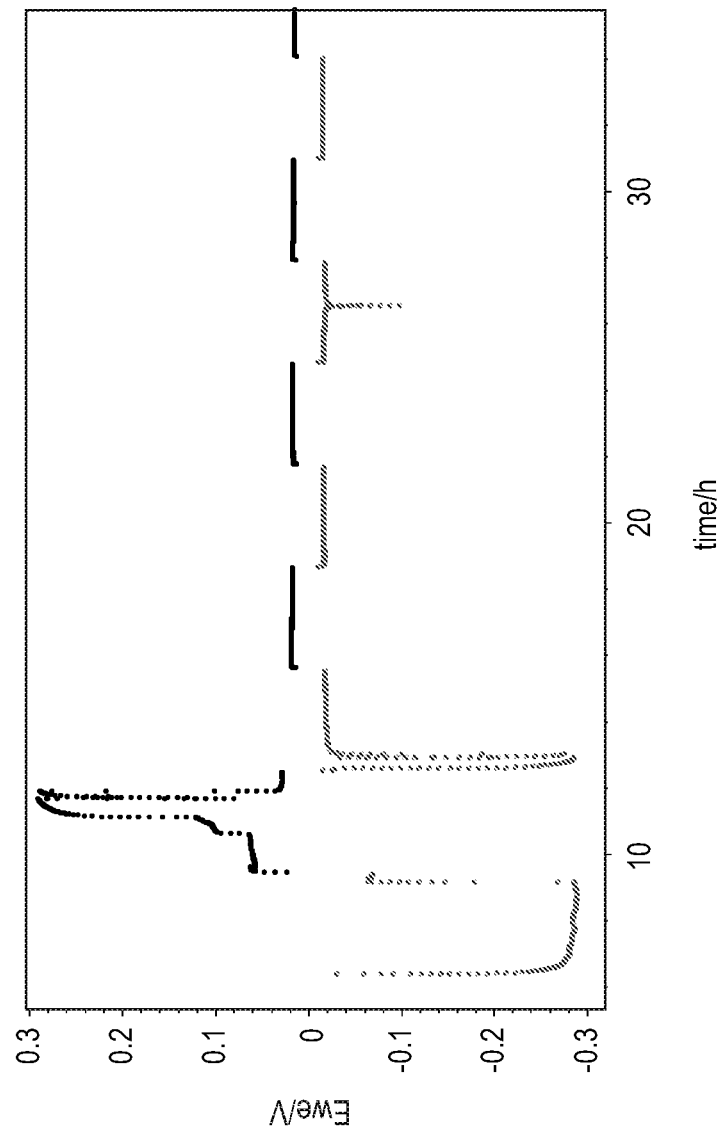
FIG. 12 is a plot of the galvanostatic cycling behavior of a Li/Li symmetric cell assembled with only the crosslinked POSS-PEG ion-conducting polymer electrolyte as described in Comparative Example 2.

FIG. 12 shows the galvanostatic cycling behavior of the Li/Li symmetric cell assembled with the crosslinked POSS-PEG ion-conducting polymer electrolyte. The cell was charged and discharged sequentially for a period of 6 hours each at various current densities. The cell showed improved cycling performance (more than 200 cycles) compared to the crosslinked PEG film electrolyte of COMPARATIVE EXAMPLE 1 under the low current density of about 25 µA/cm$^2$ due to the enhanced storage modulus (1.1 MPa for crosslinked POSS-PEG vs 0.04 MPa for crosslinked PEG). However, as shown in FIG. 12, the cell had a short circuit after a few cycles under a current density of 100 µA/cm$^2$, and failed to function properly under a current density of 200 um/cm$^2$.

The solid-state electrolyte with the crosslinked POSS-PEG ion-conducting polymer and ion-conducting membrane of the present disclosure demonstrated good electrochemical plating-striping performance at these elevated current densities.

Various examples have been described. These and other examples are within the scope of the following claims.

We claim:

1. A method for making an energy storage device, the method comprising:
dipping an ion-conducting membrane comprising ion-conducting ceramic particles retained by an insulating polymeric binder into a pre-polymer mixture comprising polymerizable compounds and a Li-ion salt, wherein the ion-conducting ceramic particles have a top part and a bottom part that are not covered by the insulating polymeric binder, the ion-conducting membrane has a first surface and an opposing second surface, and the ion-conducting ceramic particles extend from the first surface to the opposing second surface of the ion-conducting membrane;
applying a metal electrode adjacent to the first or second surface of the ion-conducting membrane; and
polymerizing the pre-polymer mixture in-situ to form an ion-conducting polymer film between the ion-conducting membrane and the electrode.

2. The method of claim 1, wherein the ion-conducting polymer film is pressure deformable and has a glass transition temperature lower than the device operation temperature.

3. The method of claim 1, wherein the pre-polymer mixture further comprises an inorganic filler chosen from carbon nanotubes, a POSS compound, metal oxides, and combinations thereof.

4. The method of claim 3, wherein the inorganic filler comprises a POSS compound.

5. The method of claim 1, wherein the Li salt is selected from lithium hexafluoroarsenate (LiAsF$_6$), lithium perchlorate (LiClO$_4$), lithium hexafluorophosphate (LiPF$_6$), lithium tetrafluoroborate (LiBF4), lithium trifluoromethanesulfonate(LiCF$_3$SO$_3$), and lithium bis(trifluoromethanesulfonyl)imide (LiTFSI).

6. The method of claim 1, wherein the ion-conducting membrane comprises a contiguous solid structure of fused and/or sintered ion-conducting ceramic particles.

7. The method of claim 1, wherein the insulating polymeric binder is selected from the group consisting of cyclo-olefin polymers, poly-para-xylylenes, benzocyclobutenes, olefin addition polymers, olefin addition copolymers, ring opening metathesis polymers and reduced forms thereof, fluorocarbon addition polymers, fluoroether polymers, cyclobutyl fluoroethers, polyarylenes, polyarylene ethers, polybenzoazoles, polysiloxanes, silsequioxanes, polycarvosilanes, and combinations thereof.

8. The method of claim 1, wherein the polymerizable compounds are selected from the group consisting of monomers that form linear polymers, monomers that form crosslinked polymers, monomers that form star polymers, monomers that form block copolymers, and combinations thereof.

9. The method of claim 1, wherein the polymerizable compounds comprise a polyethylene glycol.

10. The method of claim 9, wherein the polyethylene glycol is crosslinked.

11. The method of claim 9, wherein the polyethylene glycol comprises an acrylate and/or a diacrylate.

* * * * *